United States Patent [19]
Laute et al.

[11] Patent Number: 5,268,699
[45] Date of Patent: Dec. 7, 1993

[54] DATA COMMUNICATION RECEIVER UTILIZING A LOOP ANTENNA HAVING A HINGED CONNECTION

[75] Inventors: Peter K. Laute, Coral Springs; Eric T. Eaton, Lake Worth, both of Fla.

[73] Assignee: Motorola, Inc., Schaumburg, Ill.

[21] Appl. No.: 949,950

[22] Filed: Sep. 24, 1992

[51] Int. Cl.⁵ .......................... H01Q 1/24; H04B 1/08
[52] U.S. Cl. ...................................... 343/702; 343/873; 455/351
[58] Field of Search ................ 343/702, 700 MS, 873, 343/741; 455/90, 89, 347, 351

[56] References Cited

U.S. PATENT DOCUMENTS

| | | | |
|---|---|---|---|
| 3,736,591 | 5/1973 | Rennels et al. | 343/702 |
| 4,123,756 | 10/1978 | Nagata et al. | 343/702 |
| 4,491,978 | 1/1985 | Nagata et al. | 455/338 |
| 4,814,776 | 3/1989 | Caci et al. | 343/702 |
| 4,935,745 | 6/1990 | Mori et al. | 343/702 |
| 5,023,621 | 6/1991 | Ushiyama et al. | 343/702 |
| 5,054,120 | 10/1991 | Ushiyama et al. | 455/351 |
| 5,079,559 | 1/1992 | Umetsu et al. | 343/702 |

FOREIGN PATENT DOCUMENTS 0007204 1/1985 Japan .................................. 343/702
0149904 6/1991 Japan .

Primary Examiner—Donald T. Hajec
Assistant Examiner—Hoanganh Le
Attorney, Agent, or Firm—Kelly A. Gardner; Daniel R. Collopy; Thomas G. Berry

[57] ABSTRACT

A substantially card shaped data communication receiver (100) for receiving radio frequency (RF) signals comprises receiver circuitry for recovering information included in the RF signals, an insulative frame (210), a first conductive panel (215) disposed over a first side of the frame (210), and a second conductive panel (220) disposed over a second side of the frame (210) such that the receiver circuitry is enclosed within the space defined by the frame (210) and the first and second panels (215, 220). The first and second panels (215, 220) have coupling members formed thereon for electrically coupling the first panel (215) to the second panel (220). The data communication receiver (100) further comprises a first conductor (510) for electrically coupling the first panel (215) and the receiver circuitry and a second conductor (505) for electrically coupling the second panel (220) to the receiver circuitry such that the first and second panels (215, 220) function as an RF antenna when disposed over the first and second sides, respectively, of the frame (210).

9 Claims, 2 Drawing Sheets

DATA COMMUNICATION RECEIVER UTILIZING A LOOP ANTENNA HAVING A HINGED CONNECTION

FIELD OF THE INVENTION

This invention relates in general to antennas, and more specifically to a loop antenna having a hinged connection for use with a card type data communication receiver.

BACKGROUND OF THE INVENTION

Conventional data communication receivers utilize many types of antennas for receiving signals having specific frequencies. Typically, antenna size and shape varies with both the frequency of the signals the antenna is to receive and the size and shape of the data communication receiver which houses the antenna. For instance, in many low frequency applications, the antenna takes the form of a wire connected to the receiver. In VHF and UHF bands, antennas are often shaped such that an electrical loop is formed by the antenna. In each case, however, the antenna must not only function electrically, but also physically fit into the data communication receiver.

As data communication receivers have become smaller and more complex, the space available for accommodating an antenna has decreased. One solution to this problem is to reduce the size of the antenna. This cannot always be done, however, without adversely affecting the electrical performance of the data communication receiver. A further solution to this problem, then, is to change the shape, rather than the size, of the antenna.

Along these lines, one conventional data communication receiver is designed such that the antenna is embedded within the housing. As a result, the antenna is held by the housing and no fasteners are necessary to secure the antenna. Thus, space within the housing that would normally be consumed by antenna fasteners, such as screws or clips, may be utilized to accommodate other mechanical and electrical components. The amount of additional space provided by this method, however, is minimal because fasteners are generally relatively small compared to other components utilized by the data communication receiver.

Another conventional data communication receiver, a card type receiver, actually employs the antenna as a portion of the housing. The antenna is formed from two conductive plates, one of which is used as a back cover of the data communication receiver and one of which is used as front cover of the data communication receiver. The plates are held apart by a frame defining the sides of the data communication receiver. Typically, the plates are secured to the frame by a plurality of screws which also electrically couple the two plates. In this manner, space for accommodating the antenna is provided by eliminating the areas of the housing which would normally form the front and back covers. Therefore, the interior of the data communication receiver may be filled with components other than the antenna, a feature that is especially useful in card type receivers, in which space is at a premium.

The use of the screws, however, to secure and electrically couple the antenna plates can create problems, both mechanical and electrical. For instance, the threads of the screws may easily become deformed or worn during assembly of the data communication receiver if the force used to tighten the screws is too great. As a result, the data communication receiver may sometimes be difficult or impossible to disassemble for repair purposes. Conversely, proper electrical performance of the data communication receiver is dependent upon the degree to which each screw is tightened. If, for example, the torque applied to each screw is insufficient, i.e., the screws are not properly tightened, the increase in contact resistance between the two plates may degrade the electrical performance.

Thus, what is needed is an improved method for electrically coupling two antenna plates in a card type receiver. Furthermore, the coupling method should not cause variations in the contact resistance, and therefore variations in the electrical performance, of the antenna.

SUMMARY OF THE INVENTION

A substantially card shaped data communication receiver for receiving radio frequency (RF) signals comprises receiver circuitry for recovering information included in the RF signals and an insulative frame partially defining a space within which the receiver circuitry is enclosed and having a cavity formed therein. A first conductive panel is disposed over a first side of the frame, the first panel having a first coupling member formed thereon, wherein the first coupling member is spring-loaded and formed from a resilient material. A second conductive panel is disposed over a second side of the frame opposite the first side of the frame such that the frame is held between the first and second panels, thereby enclosing the receiver circuitry within the space defined by the frame and the first and second panels. The second panel has a second coupling member formed thereon, and the first and second coupling members are disposed within the cavity formed in the frame. The first coupling member is forced into electrical contact with the second coupling member by the frame such that the first panel is electrically coupled to the second panel when the first and second panels are disposed over the first and second sides, respectively, of the frame. A first conductor electrically couples the first panel and the receiver circuitry to provide the RF signals received by the first panel to the receiver circuitry when the first panel is disposed over the first side of the frame, and a second conductor electrically couples the second panel to the receiver circuitry when the second panel is disposed over the second side of the frame, wherein the first and second panels function as an RF antenna when disposed over the first and second sides, respectively, of the frame.

DESCRIPTION OF A PREFERRED EMBODIMENT

Figure 1:
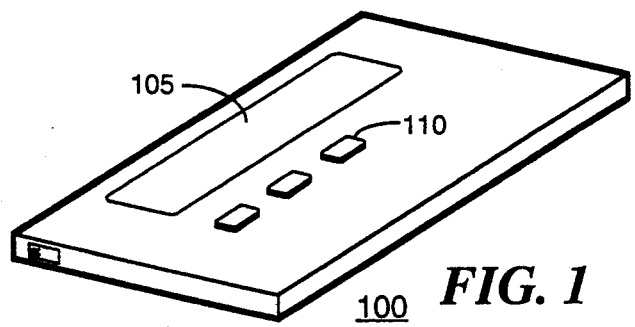
FIG. 1 is an illustration of a card shaped data communication receiver in accordance with a preferred embodiment of the present invention.

FIG. 1 is an illustration of a card shaped data communication receiver 100 in accordance with a preferred embodiment of the present invention. The data communication receiver 100 is carried by a user and receives radio frequency (RF) signals. Receiver circuitry included within the data communication receiver 100 recovers selective call messages from the RF signals for subsequent presentation by a display device 105. The visible presentation of each selective call message may be performed automatically in response to reception of the selective call message or manually in response to user manipulation of controls 110 located on the exterior of the data communication receiver 100.

Figure 2:
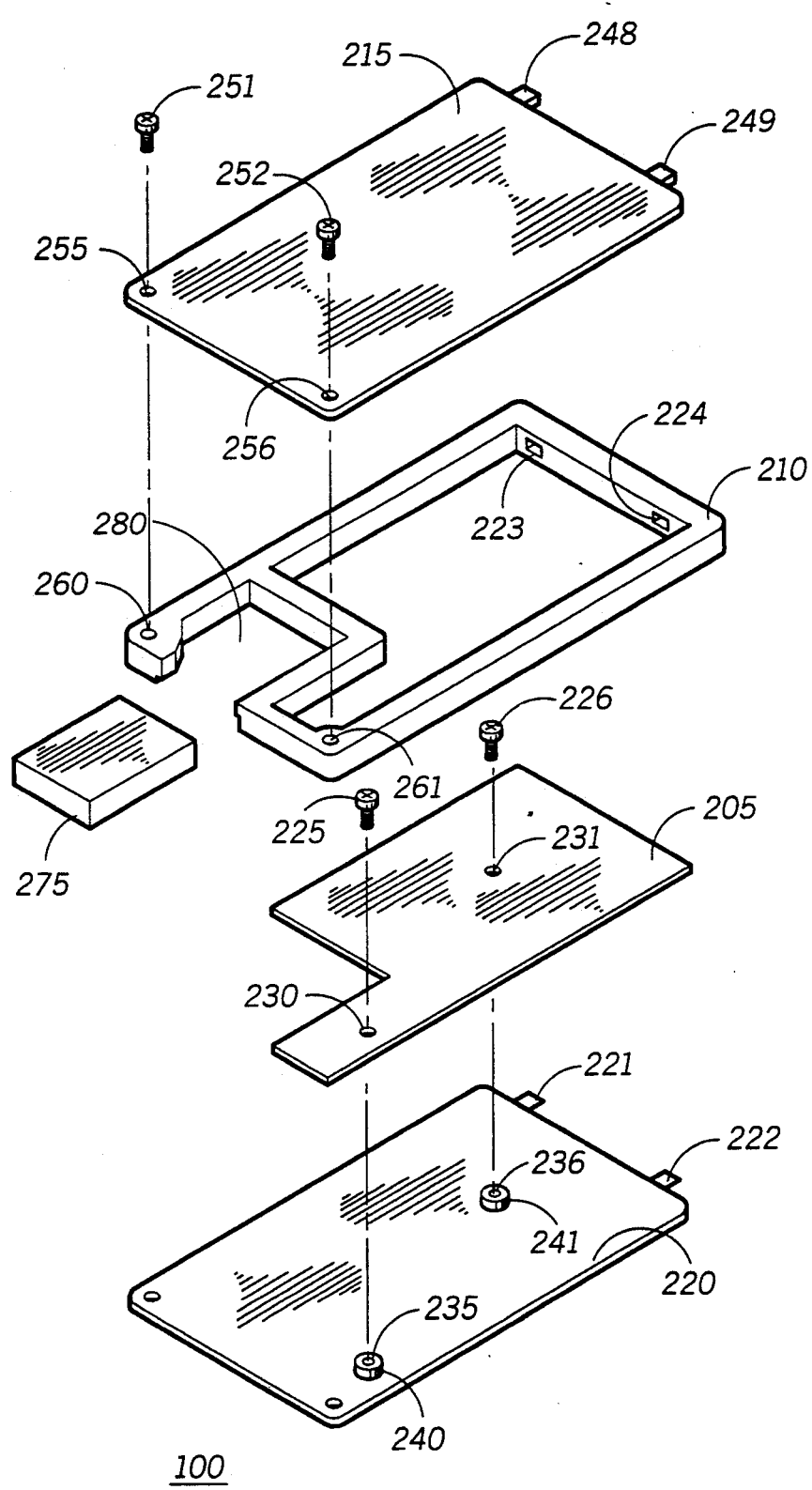
FIG. 2 is an exploded view of the data communication receiver of FIG. 1 in accordance with the preferred embodiment of the present invention.

Referring next to FIG. 2, an exploded view of the data communication receiver 100 is shown. The data communication receiver 100 comprises a printed circuit (pc) board 205, on which the receiver circuitry (not shown) is mounted, an insulative frame 210, and top and bottom rectangular panels 215, 220. The top and bottom panels 215, 220 are preferably formed from stainless steel sheet approximately 0.03 cm thick, which is selectively plated with silver or gold. It may be appreciated, however, that other conductive materials, such as nickel, may be used to form the top and bottom panels 215, 220, when suitable plating is used.

The pc board 205 is shaped such that it fits within the frame 210, which is molded from a material such as polycarbonate and to which the bottom panel 220 is bonded, such as by adhesive bonding or insert molding, at its margin. Additionally, in accordance with the preferred embodiment of the present invention, first and second conductive coupling members 221, 222 formed at an end of the bottom panel 220 are bonded within cavities 223, 224 formed within an end of the frame 210. The pc board 205 is secured to the bottom panel 220, and thus within the frame 210, by fasteners, e.g., screws 225, 226 that are passed through pc board holes 230, 231. The pc board holes 230, 231 are aligned with threaded holes 235, 236 formed in posts 240, 241, which are preferably welded or soldered to the bottom panel 220.

According to the present invention, the top panel 215 is fastened to the frame at one end by third and fourth conductive coupling members 248, 249 formed thereon. The third and fourth coupling members 248, 249, preferably formed into resilient contacts, are forcibly inserted into the cavities 223, 224 and, in this position, are surrounded by the first and second coupling members 221, 222. The interiors of the cavities 223, 224, therefore, and the first and second coupling members 221, 222 securely hold the third and fourth coupling members 248, 249 such that they remain in electrical contact with the first and second coupling members 221, 222, as will be described in greater detail below. The top panel 215 is further fastened to the frame 210 by screws 251, 252, which pass through holes 255, 256 formed in the top panel 215 and aligned with tapped holes 260, 261 formed in the frame 210. The tapped holes 260, 261 are preferably provided by embedding tapped metallic members, such as insert moldable tapped inserts, in the frame 210 during the molding process. After assembly of the data communication receiver 100, a battery 275 may be inserted within a battery opening 280 in the frame 210, thereby electrically contacting and powering the receiver circuitry. When the data communication receiver 100 is properly assembled, a conductive path is formed between the top and bottom panels 215, 220 and the receiver circuitry, in a manner to be described below, such that the top and bottom panels 215, 220 function as a loop antenna for receiving RF signals.

Figure 3:
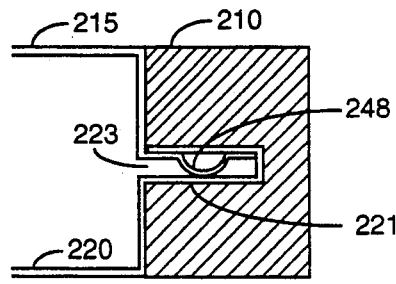
FIG. 3 is a side, cutaway view of coupling members utilized to electrically couple top and bottom antenna panels of the data communication receiver of FIG. 1 in accordance with the preferred embodiment of the present invention.

FIG. 3 is a side, cutaway view of the electrical coupling of the top and bottom panels 215, 220 in accordance with the preferred embodiment of the present invention. As described above, the first and second coupling members 221, 222 formed on the bottom panel 220 are bonded along the interior walls of the cavities 223, 224 formed in the frame 210. When the top panel 215 is assembled to the frame 210, the third and fourth coupling members 248, 249 forcibly slide into the cavities 223, 224 and are pressed against the first and second coupling members 221, 222. In this manner, the top and bottom panels 215, 220 are electrically coupled simply by assembling them to the frame 210. Furthermore, no additional parts, such as the screws utilized by prior art data communication receivers, are necessary to couple the top and bottom panels 215, 220. As a result, problems associated with the use of screws to electrically couple the top and bottom panels are eliminated by the data communication receiver 100 in accordance with the preferred embodiment of the present invention. As mentioned above, the most common problems arising from the use of the screws in prior art data communication receivers result from improper tightening of the screws. When the screws are tightened insufficiently, contact resistance between the top and bottom panels increases and performance of the antenna is often degraded. When too great of a force is applied to tighten the screws, the threads of the screws may be deformed, i.e., the screws may be stripped, and become difficult or impossible to remove. Therefore, in the data communication receiver 100 according to the present invention, utilization of the cavities 223, 224 to securely hold the coupling members together, and thereby electrically couple the top and bottom panels 215, 220, allows for proper and consistent electrical coupling between the top and bottom panels 215, 220 each time the data communication receiver 100 is assembled.

Figure 4:
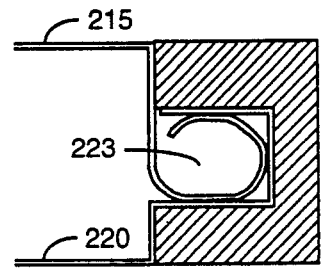
FIG. 4 is a side, cutaway view of coupling members utilized to electrically couple top and bottom antenna panels of a data communication receiver in accordance with a first alternate embodiment of the present invention.

FIG. 4 is a side, cutaway view of the electrical coupling of the top and bottom panels 215, 220 in accordance with an alternate embodiment of the present invention. As shown, the coupling members formed on the bottom panel 220 may be bonded along all of the interior walls of the cavities 223, 224. Therefore, the coupling members formed on the top panel 215, if curved into substantially cylindrical shapes, will contact the coupling members formed on the bottom panel 220 in multiple locations. It may be appreciated by one skilled in the art, however, that the coupling members formed on the top and bottom panels 215, 220 may be formed in many different shapes.

Figure 5:
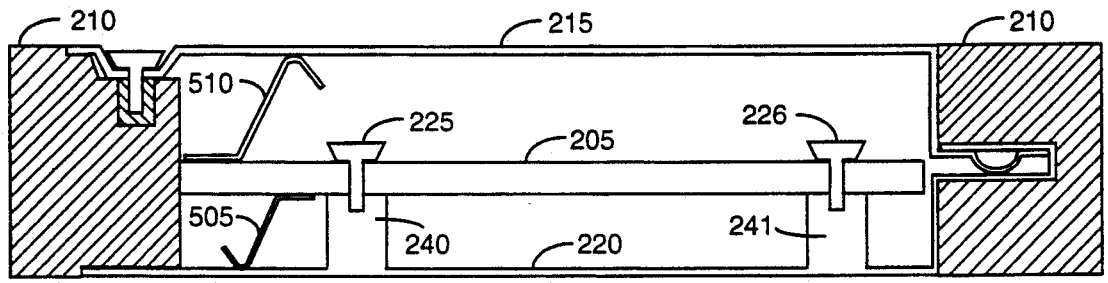
FIG. 5 is a side view of the data communication receiver of FIG. 1 in accordance with the preferred embodiment of the present invention.

Referring next to FIG. 5, a side view of the data communication receiver 100 is shown. In accordance with the preferred embodiment of the present invention, first and second resilient, electrical contacts 505, 510 are soldered to opposite sides of the pc board 205. As described above, the pc board 205 is secured within the frame 210 by the screws 225, 226 which are passed through the pc board holes 230, 231 (FIG. 2) into the posts 240, 241 mounted on the bottom panel 220. When the pc board 205 is secured within the frame 210, the first contact 505 is forcibly held against the bottom panel 220, thereby providing for the transmission of RF signals to a first portion of the receiver circuitry mounted on the pc board 205. When the top panel 215 is assembled to the frame 210, the second contact 510 provides an electrical connection between the top panel 215 and a second portion of the receiver circuitry. In this manner, a conductive path is completed between the top and bottom panels 215, 220 and the receiver circuitry such that the top and bottom panels 215, 220 form a loop antenna for reception of RF signals.

In accordance with the preferred embodiment of the present invention, screws are unnecessary for electrically coupling the receiver circuitry to the top and bottom panels 215, 220. As in the above described connection of the coupling members, therefore, errors resulting from improper tightening of the screws are eliminated. As a result, contact resistance between the receiver circuitry and the top and bottom panels 215, 220 remains consistent. Furthermore, because the electrical performance of the antenna is directly related to the contact resistance, the electrical performance of the antenna also remains consistent.

Figure 6:
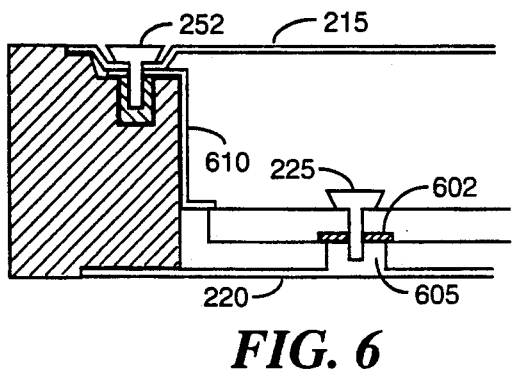
FIG. 6 is a side, cutaway view of a fastener and a conductor utilized to electrically couple receiver circuitry to top and bottom antenna panels of a data communication receiver in accordance with a second alternate embodiment of the present invention.

FIG. 6 is a side, cutaway view of the data communication receiver depicting an alternate embodiment of the connection of the pc board 205 to the top and bottom panels 215, 220. As shown, an exposed portion 602 of the receiver circuitry is held in contact with a conductive post 605 by the screw 225, which is passed through the pc board hole 230 (FIG. 2) into a tapped hole in the post 605. In accordance with the alternate embodiment of the present invention, the post 605 is electrically coupled, e.g., soldered or welded, to the bottom panel 220. Therefore, the exposed portion 602 of the receiver circuitry is electrically coupled to the bottom panel 220. Additionally, the receiver circuitry is electrically coupled to the top panel 215 via a conductor 610 soldered to the pc board 205. The screw 252 is passed through the hole 256 (FIG. 2) in the top panel 215 and further through a hole formed in the conductor 610. The screw 252 forcibly holds the top panel 215 against the conductor 610, thereby providing for the electrical connection between the receiver circuitry and the top panel 215. According to the alternate embodiment of the present invention, therefore, the electrical coupling of the receiver circuitry to the top and bottom panels 215, 220 relies on proper tightening of the screws 225, 252 and thus is subject to inconsistencies in the contact resistance between the receiver circuitry and the top and bottom panels 215, 220. However, employment of the screws 225, 252 to electrically couple the receiver circuitry to the top and bottom panels 215, 220 in accordance with the alternate embodiment of the present invention is useful in situations in which utilization of the first and second contacts 505, 510 (FIG. 5) is not feasible. For instance, in a card shaped data communication receiver having more than one pc board, the interior of the data communication receiver may contain insufficient space for placement of resilient contacts large enough to contact opposite sides of a pc board and the top and bottom panels 215, 220.

Figure 7:
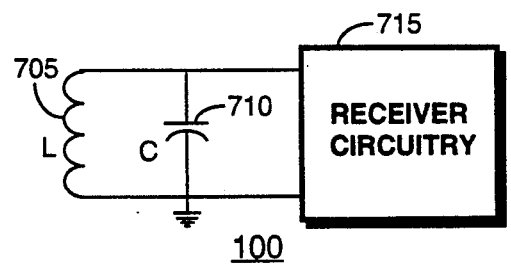
FIG. 7 is an electrical equivalent circuit of the data communication receiver of FIG. 1 in accordance with the preferred embodiment of the present invention.

FIG. 7 is an illustration of an equivalent circuit of the data communication receiver 100. In accordance with the preferred embodiment of the present invention, an inductive value, L, 705 represents an equivalent circuit of the loop antenna formed by the top and bottom panels 215, 220 (FIG. 5). The inductive value 705 is connected in parallel across a capacitive value, C, 710, which represents a capacitive equivalent circuit within the data communication receiver 100. The inductive value 705 and the capacitive value 710 resonate at a frequency which may be varied according to the capacitive value 710, thereby providing for the reception of RF signals having a frequency equal to that of the resonant frequency. The received RF signals are then coupled to the receiver circuitry 715, which recovers the selective call messages included within the RF signals.

In summary, the data communication receiver in accordance with the preferred embodiment of the present invention utilizes a loop antenna having a hinged connection, i.e., the connection of the coupling members formed on the top and bottom panels. Therefore, the electrical coupling of the top and bottom panels forming the antenna is performed without the use of additional fasteners, such as screws. As a result, because molded cavities in the frame of the data communication receiver hold the coupling members firmly together, contact resistance between the top and bottom panels remains consistent. Additionally, the electrical performance of the antenna remains consistent.

In conventional data communication receivers, however, the panels employed to form the antenna are often electrically coupled through use of screws. Variations, then, in the contact resistance of the antenna can result from improper tightening of the screws. When the screws are not sufficiently tightened, the contact resistance increases, causing possible degradation in the performance of the antenna. The user of the data communication receiver may perceive this degradation in performance as missed selective call messages. Conversely, when too great of a force is applied to tighten the screws, the threads of the screws may become deformed. As a result, the screws may be difficult or impossible to remove in instances when the data communication receiver needs to be disassembled for repair.

The data communication receiver in accordance with the preferred embodiment of the present invention does not suffer from variations in antenna performance to the same extent as conventional data communication receivers. The more consistent antenna performance results directly from the elimination of the screws employed to couple the top and bottom panels of the antenna. Additionally, even greater consistence in antenna performance may be realized by the elimination of the screws used, in prior art data communication receivers, to couple the antenna to the receiver circuitry.

It may be appreciated by now that there has been provided an improved method for electrically coupling two antenna plates in a card type receiver. Furthermore, the coupling method does not cause variations in the contact resistance, and therefore variations in the electrical performance, of the antenna.

We claim:

1. A substantially card shaped data communication receiver for receiving radio frequency (RF) signals, comprising:

receiver circuitry for recovering information included in the RF signals;

an insulative frame partially defining a space within which the receiver circuitry is enclosed, the frame having a cavity formed therein;

a first conductive panel disposed over a first side of the frame, the first panel having a first coupling member formed thereon, wherein the first coupling member is spring-loaded and formed from a resilient material;

a second conductive panel disposed over a second side of the frame opposite the first side of the frame such that the frame is held between the first and second panels, thereby enclosing the receiver circuitry within the space defined by the frame and the first and second panels, wherein the second panel has a second coupling member formed thereon, and wherein the first and second coupling members are disposed within the cavity formed in the frame and the first coupling member is forced into electrical contact with the second coupling member by the frame such that the first panel is electrically coupled to the second panel when the first and second panels are disposed over the first and second sides, respectively, of the frame;

a first conductor for electrically coupling the first panel and the receiver circuitry to provide the RF signals received by the fist panel to the receiver circuitry when the first panel is disposed over the first side of the frame;

a second conductor for electrically coupling the second panel to the receiver circuitry when the second panel is disposed over the second side of the frame, wherein the first and second panels function as an RF antenna when disposed over the first and second sides, respectively, of the frame.

2. The data communication receiver in accordance with claim 1, wherein the first conductor is a conductive fastener which additionally secures the first panel to the frame.

3. The data communication receiver in accordance with claim 1, wherein the first conductor is a resilient contact formed on the first panel for electrically contacting the receiver circuitry when the first panel is disposed over the first side of the frame.

4. The data communication receiver in accordance with claim 3, further comprising a fastener for securing the first panel to the frame.

5. The data communication receiver in accordance with claim 1, wherein the second conductor is a conductive fastener which additionally secures the second panel to the frame.

6. The data communication receiver in accordance with claim 1, wherein the second conductor is a resilient contact formed on the second panel for electrically contacting the receiver circuitry when the second panel is disposed over the second side of the frame.

7. The data communication receiver in accordance with claim 6, further comprising a fastener for securing the second panel to the frame.

8. A substantially card shaped data communication receiver for receiving radio frequency (RF) signals, comprising:

receiver circuitry for recovering information included in the RF signals;

an insulative frame partially defining a space within which the receiver circuitry is enclosed, the frame having a cavity formed therein;

a first conductive panel disposed over a first side of the frame, the first panel having a first coupling member formed thereon, wherein the first coupling member is spring-loaded and formed from a resilient material;

a second conductive panel disposed over a second side of the frame opposite the first side of the frame such that the frame is held between the first and second panels, thereby enclosing the receiver circuitry within the space defined by the frame and the first and second panels, wherein the second panel has a secon coupling member formed thereon, and wherein the first and second coupling members are disposed within the cavity formed in the frame and the first coupling member is forced into electrical contact with the second coupling member by the frame such that the first panel is electrically coupled to the second panel when the first and second panels are disposed over the first and second sides, respectively, of the frame;

a first conductive fastener coupled between the first panel and the receiver circuitry for securing the first panel to the frame and for providing the RF signals received by the first panel to the receiver circuitry; and a second conductive fastener coupled between the second panel and the receiver for securing the second panel to the frame such that the first and second panels function as an RF antenna when secured to the frame.

9. A substantially card shaped data communication receiver for receiving radio frequency (RF) signals, comprising:

receiver circuitry for recovering information included in the RF signals;

an insulative frame partially defining a space within which the receiver circuitry is enclosed, the frame having a cavity formed therein;

a first conductive panel disposed over a first side of the frame, the first panel having a first coupling member formed thereon, wherein the first coupling member is spring-loaded and formed from a resilient material;

a second conductive panel disposed over a second side of the frame opposite the first side of the frame such that the frame is held between the first and second panels, thereby enclosing the receiver circuitry within the space defined by the frame and the first and second panels, wherein the second panel has a second coupling member formed thereon, and wherein the first and second coupling members are disposed within the cavity formed in the frame and the first coupling member is forced into electrical contact with the second coupling member by the frame when the first and second panels are disposed over the first and second sides, respectively, of the frame;

a first conductive, resilient contact formed on the first panel for electrically contacting the receiver circuitry to provide the RF signals received by the first panel to the receiver circuitry when the first panel is disposed over the first side of the frame;

a second conductive, resilient contact formed on the second panel for electrically contacting the receiver circuitry when the second panel is disposed over the second side of the frame, wherein the first and second panels function as an RF antenna when disposed over the first and second sides, respectively, of the frame;

a first fastener for securing the first panel to the first side of the frame; and a second fastener for securing the second panel to the second side of the frame.

* * * * *